March 6, 1956    P. M. CHRISTENSEN ET AL    2,737,044
LOCKING MEANS FOR CASING ENCLOSED MECHANISMS
Filed April 10, 1952      2 Sheets-Sheet 1
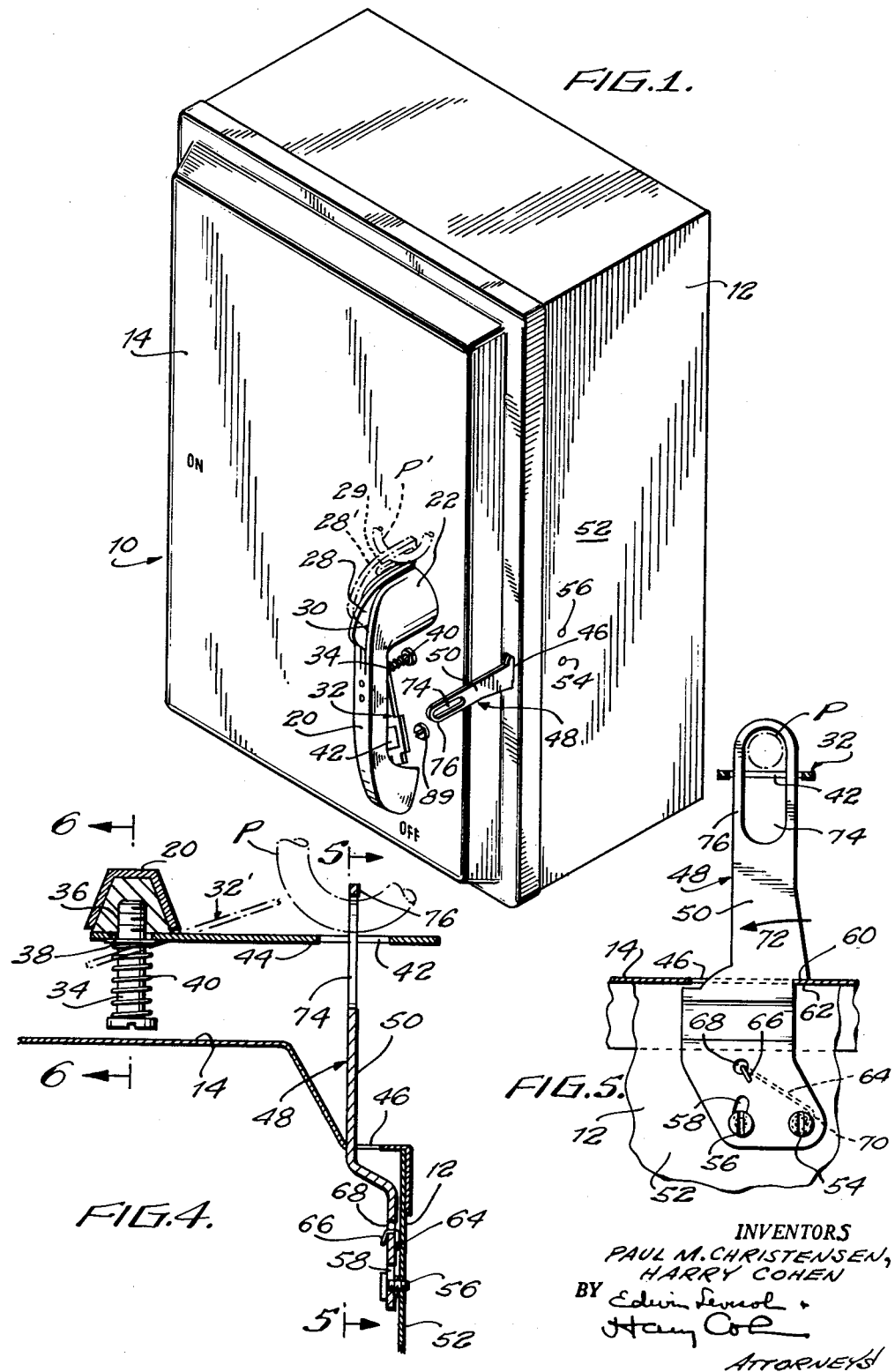
INVENTORS
PAUL M. CHRISTENSEN,
HARRY COHEN
BY Edwin Levisohn
Harry Cohen
ATTORNEYS March 6, 1956  P. M. CHRISTENSEN ET AL  2,737,044
LOCKING MEANS FOR CASING ENCLOSED MECHANISMS
Filed April 10, 1952  2 Sheets-Sheet 2
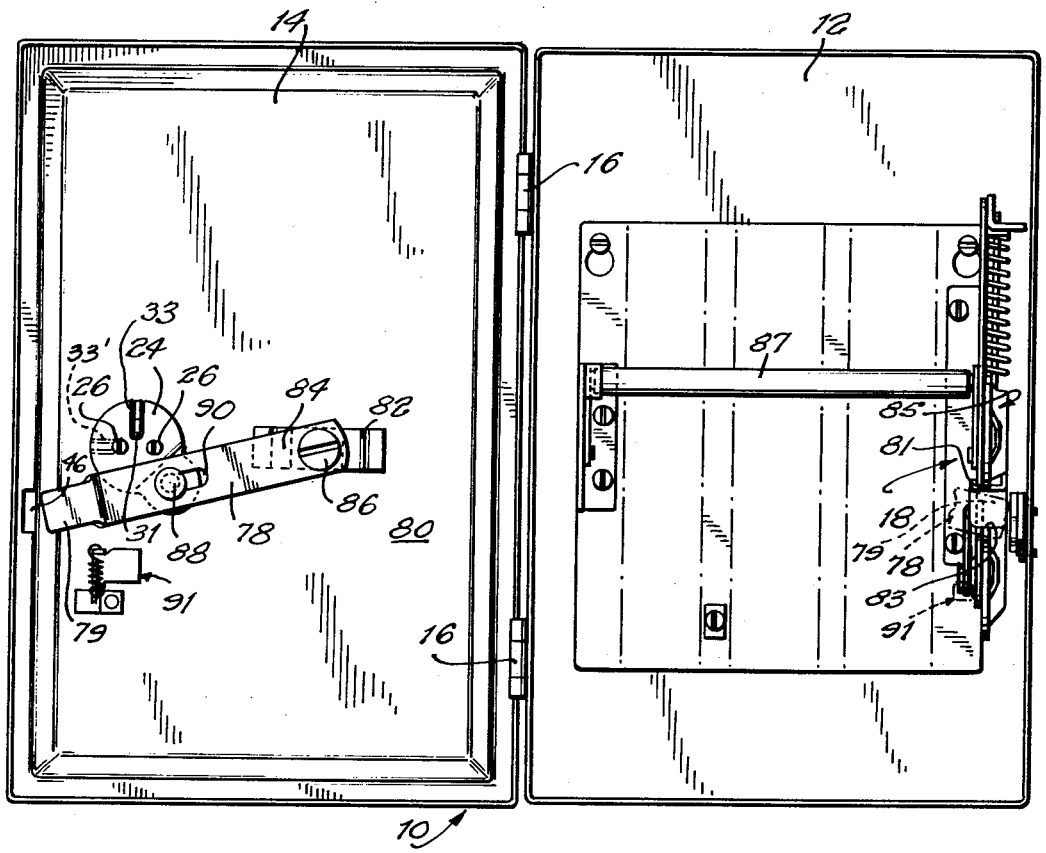
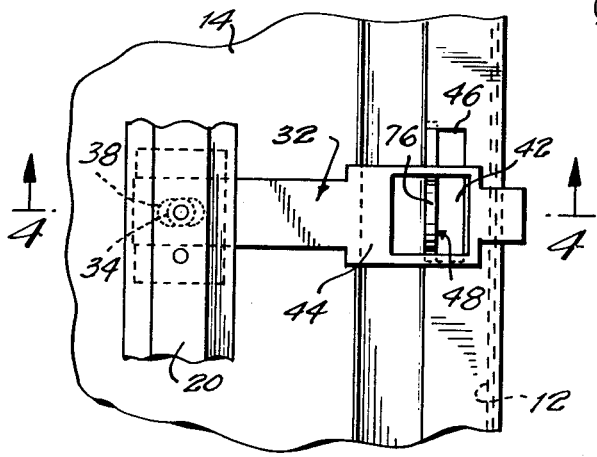
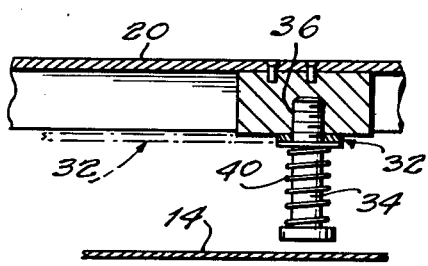
INVENTORS
PAUL M. CHRISTENSEN,
HARRY COHEN
BY Edwin Pencol +
Harry Cole
ATTORNEYS 2,737,044
Patented Mar. 6, 1956

United States Patent Office

2,737,044

LOCKING MEANS FOR CASING ENCLOSED MECHANISMS

Paul M. Christensen, West Orange, N. J., and Harry Cohen, New York, N. Y., assignors to Federal Electric Products Company, Newark, N. J., a corporation Application April 10, 1952, Serial No. 281,587

18 Claims. (Cl. 70—84)

This invention relates to improvements in locking means for casing enclosed mechanisms in general and more particularly to improvements in locking means for casing enclosed switches or circuit breakers.

One object of the present invention is the provision of generally improved means for locking the casing and operating handle of a casing enclosed mechanism having an externally mounted operating handle.

Pursuant to the above object of the present invention, there is provided, in a casing having an openable cover with an operating handle mounted thereon, improved means for releasably locking the cover to the casing.

Another object of the present invention is the provision in a casing provided with an openable cover having an operating handle movable to at least two positions, of improved means for concomitantly releasably locking the cover to the casing and the operating handle in one position.

The above and other objects, features and advantages of the present invention will be more fully understood from the following description considered in connection with the accompanying illustrative drawings.

In the drawings:

Fig. 1 is a perspective view of a casing and cover according to the present invention with the cover shown in a closed condition;

Fig. 2 is a front view of the casing and cover of Fig. 1 with the cover shown in an opened condition;

Fig. 3 is a fragmentary plan view, on an enlarged scale, taken in the region of the operating handle and showing the handle latch member in the locked position;

Fig. 4 is a sectional view taken on the line 4—4 of Fig. 3;

Fig. 5 is a sectional view taken on the line 5—5 of Fig. 4; and

Fig. 6 is a sectional view taken on the line 6—6 of Fig. 4.

Referring now to the drawings in detail, and more particularly to Figs. 1 and 2 thereof, the apparatus 10 of the present invention comprises a casing or enclosure 12 having a cover 14 which is hinged at one side thereof as indicated at 16, so that said cover may be swung to closed and opened positions, as illustrated in Figs. 1 and 2, respectively. Casing 12 is adapted for the reception of any suitable mechanism (not shown) for example a switch or circuit breaker. Disposed in casing 12 may be any suitable switch operating mechanism 18, said switch operating mechanism being preferably of either the type disclosed in application Serial No. 144,636, filed February 17, 1950, for Operating Mechanism and Interlock for Enclosed Switches, in the names of Thomas M. Cole and Paul M. Christensen or application Serial Number 281,586, filed concurrently herewith, for Improvements in Locking Means for Casing Enclosed Mechanisms, in the names of Paul M. Christensen and Harry Cohen, said applications being assigned to the assignee of the present application. As fully described and illustrated in the aforereferred to co-pending applications, the switch operating mechanism 18 is adapted for causing the engagement and disengagement of the separable contacts of a suitable switch or circuit breaker which may be disposed in casing 12.

An operating handle 20 is mounted for turning movement on cover 14, externally of the latter. Said operating handle 20 is preferably of the type illustrated and described in the co-pending application of Egmont Arens, Serial No. 75,652, filed February 10, 1949, now Patent No. 2,672,746, dated March 23, 1954, and assigned to the assignee hereof. As is fully illustrated and described in said application, and as here shown, the hub portion 22 of handle 20 registers with an opening in the cover 14, a disc 24 being disposed at the inner surface of said cover and being connected to said hub by screws 26, said handle being provided with a rectilinearly movable locking member 28 slidably movable in a slot 30 of the handle from a retracted or handle releasing position, as here shown in solid lines to a projected or handle locking position, as here shown in broken lines as indicated at 28' and as shown in said application of Egmont Arens. As further illustrated and described in said Egmont Arens application, locking member 28 has an elongated opening 29 which is disposed internally of the handle 22 when the locking member is in said retracted position, and which is disposed externally of the handle in said projected handle locking position, a removable lock P' of the padlock type being disposed in said opening and adapted to hold locking member 28 in its handle locking position. As here shown, the operating handle 20 is movable through a range of 90 degrees between an "on" and "off" position and can be locked by the locking member 28 in either the "on" or the "off" position. Thus locking member 28 is provided with a locking element 31 which is adapted to cooperate with the slots 33 for locking handle 20, their being provided two such slots 33 which are displaced 90° for locking handle 20 in either the "on" or the "off" position, slot 33 being adapted for the reception of locking element 31 to lock said handle in the "off" position and slot 33' being adapted for the reception of locking element 31 to lock said handle in the "on" position.

Pursuant to the present invention there is provided means for concomitantly releasably locking the cover 14 to the casing 12 and the operating handle 20 in its "off" position. More specifically, the operating handle 20 is provided with a latch member 32 which is floatingly pivotally mounted on said handle and is movable between a normal or unlocked position in which said latch member is in substantial alignment with said handle and a locking position, as shown in Figs. 3 and 4, in which the latch member is substantially perpendicular to said handle. The latch member 32 is secured to the underside of handle 20 as shown in Fig. 4 and for mounting said latch member to said handle there is provided a screw stud 34 having an and portion 36 which is secured to the body portion of handle 20 in any conventional manner. The latch member 32 is provided with an elongated slot 38 at one end which is adapted for the reception of the stud 34, said latch member being spring biased against the underside of the handle 20 by means of spring 40 positioned on stud 34. The latch member 32 may be pivoted about the axis of stud 34 and is limited in such pivotal movement by the hub portion 22 of the operating handle. Since the latch member 32 is provided with an elongated slot 38 and since stud 34 is of circular cross section, it will be apparent that said latch member may be pivoted a limited amount towards, and away from, cover 14 as indicated at 32' for a purpose which will be apparent from the description which follows. Thus the latch member 32 is mounted on handle 20 for pivotal movement in two planes substantially perpendicular to each other as will be readily understood. The latch member 32 is also provided with an aperture 42 at end 44, said aperture being adapted to cooperate with structure about to be described.

Cover 14 is provided with a slot 46 at a marginal side edge portion thereof, said slot being adapted to cooperate with the locking member 48 secured to the casing 12. Locking member 48 comprises an arm 50 which is pivotally mounted to the side wall 52 of casing 12 by means of the pivot pin 54 which is secured to said side wall in any conventional manner. The arm 50 is adapted for limited pivotal movement about pivot pin 54 and for this purpose there is provided a pin 56 which is secured to said side wall and which is received in the elongated slot 58 of arm 50. The arm 50 is adapted to pivot between the latched position, as shown in Fig. 5, and an unlatched position in which the arm 50 is pivoted in the direction of arrow 72 whereby the cover 14 may be opened. More particularly, the arm 50 is provided with a latch portion 60 which is adapted to interlock with the portion 62 of cover 14 in the closed condition of the latter as shown in Figs. 1 and 5. The arm 50 is spring biased to the latched position by means of the spring 64 which has one end 66 anchored in the aperture 68 of said arm and has its other end 70 secured to pivot pin 54. It will be readily apparent that cover 14 may be opened by raising arm 50 to rotate the latter about its pivot pin 54 in the direction of arrow 72 whereby the portion 62 of cover 14 clears the latch portion 60 of arm 50. Arm 50 is provided at its end, opposite its pivoted end, with an elongated aperture 74, said aperture being adapted for the reception of one or more padlock type locks P.

With the operating handle 20 in the "off" position and with the cover 14 in a closed condition the latch member 32 is adapted to be interengaged with arm 50, which projects outwardly of the casing 12, for locking cover 14 to casing 12 and for locking said operating handle in its "off" position. More particularly, the end portion 76 of arm 50 is adapted to be received in, and extend through, the aperture 42 of latch member 32 and for this purpose said latch member is pivoted to the position shown in Fig. 3 while at the same time lifting the end 44 of said latch member a sufficient amount whereby the latch member 32 and arm 50 will interengage as shown in Fig. 4. Thereafter one or more padlocks P may be inserted through aperture 74 of arm 50 to thereby lock cover 14 to casing 12 and to lock the operating handle in its "off" position, it being understood that member 32 may be pivoted or floated towards cover 14 sufficiently so as to enable a plurality of locks P to be inserted through aperture 74 up to the capacity of the latter. When cover 14 and handle 20 are locked in the aforedescribed manner, it is merely necessary to remove the padlocks P and to disengage the latch member 32 from arm 50 to unlock said cover and operating handle whereby cover 14 may be opened by manually depressing arm 50 in the manner aforedescribed. It will be understood that the locking member 28 may be used to lock the operating handle 20 in either the "on" or "off" position independently of the aforedescribed locking mechanism. Similarly it will be understood that the locking mechanism constituted by the latch member 32 and the arm 50 will be ineffective to lock the cover 14 to the casing 12 or to lock the handle 20 when said handle is moved away from its "off" position. Thus the instant locking mechanism is only effective when the cover 14 is in a closed condition and the operating handle 20 is in its "off" position. When the latch member 32 is in its normal or unlocked position it will be in substantial alignment with handle 20 at the underside thereof and accordingly will be substantially hidden from view. If desired, cover 14 may be locked to casing 12 independent of operating handle 20 by inserting one or more padlocks P through aperture 74 of arm 50 with member 32 out of engagement with arm 50, in which case cover 14 will be in a locked condition independent of the position of said operating handle.

It will be understood that the movement of the operating handle 20 will be effective to correspondingly move the actuating member 78 which is adapted to control the operating mechanism 18 disposed in casing 12. Thus the underside 80 of cover 14 is provided with a bracket 82 which is adapted to pivotally mount the end 84 of actuating member 78 by means of the pivot pin 86 which passes through member 78 and is received in bracket 82 fixed to cover 14. The disc 24 is provided with a projecting stud 88 which is received in the elongated slot 90 of member 78, said stud riding in said slot being adapted to pivot the actuating member 78 whereby to control and actuate the operating mechanism 18. It will be readily apparent from the above that the movement of the operating handle 20 will be effective to correspondingly move the actuating member 78 whereby said operating handle will be effective to actuate any suitable mechanism (not shown) disposed in casing 12. More particularly, actuating member 78 is provided with an offset end portion 79 which is adapted to be received between edges 81 and 83 of offset drive lever part 85 when cover 14 is in a closed condition whereby the movement of the operating handle 20 will be effective to move part 85 to pivot bail 87 to thereby actuate any suitable mechanism disposed in casing 12. If desired, cover 14 may be provided with an interlock release 91 which is illustrated and described in detail in the aforereferred to applications of Thomas M. Cole and Paul M. Christensen and Paul M. Christensen and Harry Cohen and is adapted for the purposes described in said co-pending applications. Thus interlock release 91 may be associated with operating mechanism 18 in the manner of said co-pending application of Thomas M. Cole and Paul M. Christensen in which case the operating handle 20 must be moved to an intermediate "open cover" position to release said interlock to open cover 14 or, if desired, interlock release 91 may be associated with operating mechanism 18 in the manner of said concurrently filed co-pending application in which case operating handle 20 and actuating member 78 will be out of interlock with interlock release 91 when handle 20 is in the "off" position. The latter arrangement is the preferred arrangement herein shown and when handle 20 is in the "off" position cover 14 may be opened without pivoting headed stud 89, which is mounted for rotation in said cover. However with handle 20 in the "on" position it will be necessary to pivot stud 89 to release interlock release 91 to open cover 14, as clearly described and illustrated in said concurrently filed application.

It will be seen from the above that the locking means constituted by the latch member 32 and the locking member 48 will effectively concomitantly lock the cover 14 to the casing 12 and the operating handle 20 in its "off" position.

While we have shown and described the preferred embodiments of our invention, it will be understood that various changes may be made in the present invention without departing from the underlying idea or principles of the invention within the scope of the appended claims.

Having thus described our invention, what we claim and desire to secure by Letters Patent is:

1. In a casing provided with an openable cover having an operating handle mounted thereon and adapted to be moved to a first position and a second position, means for releasably locking said cover to said casing when said operating handle is in said first position, said means comprising a locking member secured to said casing and a latch member secured to said handle, said latch member being pivotally mounted on said handle and movable between a normal or unlocked position in which said latch member is in substantial alignment with said handle and a locking position in which said latch member is substantially perpendicular to said handle, said latch member having an apertured end portion, said cover having a slot at a marginal side edge portion, said locking member comprising an arm projecting outwardly of said casing and adapted to project through said cover slot in the closed condition of said cover, said arm having an apertured end portion adapted for the reception of a padlock, said end portion of said arm adapted to interengage with said latch member end portion whereby to releasably lock said cover to said casing when said padlock is positioned in said aperture of said arm.

2. In a casing provided with an openable cover having an operating handle mounted thereon and adapted to be moved to a first position and a second position, means for releasably locking said cover to said casing when said operating handle is in said first position, said means comprising a locking member secured to said casing and a latch member secured to said handle, said latch member being pivotally mounted on said handle and movable between a normal or unlocked position in which said latch member is in substantial alignment with said handle and a locking position in which said latch member is substantially perpendicular to said handle, said latch member being floatingly mounted relative to said handle and having an apertured end portion, said cover having a slot at a marginal side edge portion said locking member comprising an arm projecting outwardly of said casing and adapted to project through said cover slot in the closed condition of said cover, said arm having an apertured end portion adapted for the reception of a padlock, said end portion of said arm adapted to interengage with said latch member end portion whereby to releasably lock said cover to said casing when said padlock is positioned in said aperture of said arm.

3. In a casing provided with an openable cover having an operating handle mounted thereon and adapted to be moved to a first position and a second position, means for releasably locking said cover to said casing when said operating handle is in said first position, said means comprising a locking member secured to said casing and a latch member secured to said handle, said latch member being pivotally mounted on said handle and movable between a normal or unlocked position in which said latch member is in substantial alignment with said handle and a locking position in which said latch member is substantially perpendicular to said handle, said latch member being floatingly mounted relative to said handle and having an apertured end portion, said cover having a slot at a marginal side edge portion, said locking member comprising an arm pivotally mounted on said casing and projecting outwardly thereof, said arm being adapted to project through said cover slot and having a latch portion adapted to interlock with said cover in the closed condition of the latter, said arm having an elongated apertured end portion adapted for the reception of a plurality of padlocks, said end portion of said arm adapted to interengage with said latch member end portion, whereby the insertion of a padlock in said arm end portion will be effective to lock said cover to said casing and to lock said handle in said first position.

4. In a casing provided with an openable cover having a movable operating handle mounted thereon, means for releasably locking said cover in closed position and for locking said handle in a predetermined position, said means comprising releasable interengaging parts on said cover and casing, respectively, and means movable in relation to said handle from a retracted position to a projected position and releasably engageable when in one of said positions with one of said interengaging parts, means for releasably holding said one interengaging part in operative condition when engaged with said movable means to prevent opening of said cover, said means which is movable in relation to said handle having an opening in which part of one of said interengaging parts may be received, to prevent movement of said movable means to retracted position.

5. In a casing for enclosing a mechanism therein and having a body part and a cover for the latter movably mounted thereon and a handle mounted externally of the casing for operating said mechanism, a latching member movably mounted on said casing and having a portion disposed externally of the casing near said handle so that the latter and said latching member can be operated substantially simultaneously with the same hand of the operator to actuate both said mechanism and said latching member, said handle being mounted on said cover so that upon said release of the latching member the cover can be moved to open position with said same hand of the operator, and means associated with said handle and movable from one position to another position, said last mentioned means and said latching member having portions which, in one of said positions, cooperate with each other to prevent operative movement of said handle in at least one direction, one of said last mentioned portions having an opening through which the other of said last mentioned portions project, and the projecting part of the other of said last mentioned portions having an opening to receive a padlock to lock said portions together whereby a single padlock is effective to prevent operation of the handle and to lock the cover closed.

6. In a casing having a receptacle body part and a cover part pivotally mounted thereon for movement to open and closed positions and a handle pivotally mounted on one of said parts externally thereof and provided with actuating means disposed internally of the casing, means for locking the handle in a predetermined position and concomitantly locking the casing cover in closed position, comprising a cover locking member mounted movably on one of said casing parts and releasably engageable with means fixed in relation to the other of said casing parts for holding the cover part in closed position, said cover locking member having a part disposed externally of the casing, and means including a member movably mounted on the handle externally of the casing for releasable engagement with said cover locking member for preventing operative movement of said handle in at least one direction.

7. In a casing having a receptacle body part and a cover part pivotally mounted thereon for movement to open and closed positions and a handle pivotally mounted on one of said parts externally thereof and provided with actuating means disposed internally of the casing, means for locking the handle in a predetermined position and concomitantly locking the casing cover in closed position, comprising a cover locking member mounted movably on one of said casing parts and releasably engageable with means fixed in relation to the other of said casing parts for holding the cover part in closed position, said cover locking member having a part disposed externally of the casing, and means including a member movably mounted on the handle externally of the casing for releasable engagement with said cover locking member for preventing operative movement of said handle in at least one direction, said handle being mounted on said cover part and said handle-mounted member having an opening through which said cover locking member projects when the cover is closed and said handle-mounted member and said cover-locking member are in engagement with each other, the projecting part of said locking member being adapted to be connected to means for preventing the removal of said handle mounted member from engagement with said projecting part of said locking member when said members are interengaged.

8. In a casing having a receptacle body part and a cover part pivotally mounted thereon for movement to open and closed positions and a handle pivotally mounted on one of said parts externally thereof and provided with actuating means disposed internally of the casing, means for locking the handle in a predetermined position and concomitantly locking the casing cover in closed position, comprising a cover locking member mounted movably on one of said casing parts and releasably engageable with means fixed in relation to the other of said casing parts for holding the cover part in closed position, said cover locking member having a part disposed externally of the casing, and means including a member movably mounted on the handle externally of the casing for releasable engagement with said cover locking member for preventing operative movement of said handle in at least one direction, said handle-mounted member having a retracted position at the underside of the handle and movable to a projected position transversely of the handle for said engagement with said cover-locking member.

9. In a casing having a receptacle body part and a cover part pivotally mounted thereon for movement to open and closed positions and a handle pivotally mounted on one of said parts externally thereof and provided with actuating means disposed internally of the casing, means for locking the handle in a predetermined position and concomitantly locking the casing cover in closed position, comprising a cover locking member mounted movably on one of said casing parts and releasably engageable with means fixed in relation to the other of said casing parts for holding the cover part in closed position, said cover locking member having a part disposed externally of the casing, and means including a member movably mounted on the handle externally of the casing for releasable engagement with said cover locking member for preventing operative movement of said handle in at least one direction, said handle mounted member having a retracted position at the underside of the handle and movable to a projected position transversely of the handle for said engagement with said cover-locking member, and means including a resilient member for holding said handle-mounting member in said retracted position.

10. In a casing having a receptacle body part and a cover part pivotally mounted thereon for movement to open and closed positions and a handle pivotally mounted on one of said parts externally thereof and provided with actuating means disposed internally of the casing, means for locking the handle in a predetermined position and concomitantly locking the casing cover in closed position, comprising a cover locking member mounted movably on one of said casing parts and releasably engageable with means fixed in relation to the other of said casing parts for holding the cover part in closed position, said cover locking member having a part disposed externally of the casing, and means including a member movably mounted on the handle externally of the casing for releasable engagement with said cover locking member for preventing operative movement of said handle in at least one direction, said handle-mounted member having a retracted position at the underside of the handle and movable to a projected position transversely of the handle for said engagement with said cover-locking member, and means including a resilient member for holding said handle-mounted member in said retracted position, said handle being mounted on said cover part and said handle-mounted member having an opening through which said cover locking member projects when the cover is closed and said handle-mounted member and said cover-locking member are in engagement with each other, the projecting part of said locking member being adapted to be connected to means for preventing the removal of said handle-mounted member from engagement with said cover locking member when said members are in interengagement.

11. In a casing having a receptacle body part and a cover part pivotally mounted thereon for movement to open and closed positions and a handle pivotally mounted on one of said parts externally thereof and provided with actuating means disposed internally of the casing, means for locking the handle in a predetermined position and concomitantly locking the casing cover in closed position, comprising a cover locking member mounted movably on one of said casing parts and releasably engageable with means fixed in relation to the other of said casing parts for holding the cover part in closed position, said cover locking member having a part disposed externally of the casing, and means including a member movably mounted on the handle externally of the casing for releasable engagement with said cover locking member for preventing operative movement of said handle in at least one direction, said handle-mounted member having a retracted position at the underside of the handle and movable to a projected position transversely of the handle for said engagement with said cover-locking member, said handle being mounted on said cover part, the latter having an opening and the cover locking member being mounted internally of the casing part for projection through said cover opening when the cover is closed.

12. In a casing having a receptacle body part and a cover part pivotally mounted thereon for movement to open and closed positions and a handle pivotally mounted on one of said parts externally thereof and provided with actuating means disposed internally of the casing, means for locking the handle in a predetermined position and concomitantly locking the casing cover in closed position, comprising a cover locking member mounted movably on one of said casing parts and releasably engageable with means fixed in relation to the other of said casing parts for holding the cover part in closed position, said cover locking member having a part disposed externally of the casing, and means including a member movably mounted on the handle externally of the casing for releasable engagement with said cover locking member for preventing operative movement of said handle in at least one direction, said handle-mounted member having a retracted position at the underside of the handle and movable to a projected position transversely of the handle for said engagement with said cover-locking member, said handle being mounted on said cover part, the latter having an opening and the cover locking member being mounted internally of the casing part for projection through said cover opening when the cover is closed, said handle-mounted member and said cover-locking member having provision for securing them to each other in their said mutually engaged positions.

13. In a casing having a receptacle body part and a cover part pivotally mounted thereon for movement to open and closed positions and a handle pivotally mounted on one of said parts externally thereof and provided with actuating means disposed internally of the casing, means for locking the handle in a predetermined position and concomitantly locking the casing cover in closed position, comprising a cover locking member mounted movably on one of said casing parts and releasably engageable with means fixed in relation to the other of said casing parts for holding the cover part in closed position, said cover locking member having a part disposed externally of the casing, and means including a member movably mounted on the handle externally of the casing for releasable engagement with said cover locking member for preventing operative movement of said handle in at least one direction, said handle-mounted member having a retracted position at the underside of the handle and movable to a projected position transversely of the handle for said engagement with said cover-locking member, and means including a resilient member for holding said handle-mounted member in said retracted position, said handle being mounted on said cover part, the latter having an opening and the cover locking member being mounted internally of the casing part for projection through said cover opening when the cover is closed, said handle-mounted member and said cover-locking member having provision for securing them to each other in their said mutually engaged positions.

14. In a casing having a receptacle part and a cover part mounted thereon for movement to open and closed positions and an operating handle movably mounted on said cover part externally thereof, means for locking said handle in a predetermined position and concomitantly locking said cover part in closed position, comprising releasably interengaging parts on said receptacle part and cover part, respectively, for holding the latter part in closed position, one of said interengaging parts having a part disposed externally of said cover part, and means including a member movably mounted on said handle between unlocked and locked positions externally of said cover part for releasable engagement in the locked position thereof with said externally disposed part for preventing operative movement of said handle in at least one direction.

15. In a casing having a receptacle part and a cover part mounted thereon for movement to open and closed positions and an operating handle movably mounted on said cover part externally thereof, means for locking said handle in a predetermined position and concomitantly locking said cover part in closed position, comprising releasably interengaging parts on said receptacle part and cover part, respectively, for holding the latter part in closed position, one of said interengaging parts having a part disposed externally of said cover part, and means including a member movably mounted on said handle between unlocked and locked positions externally of said cover part for releasable engagement in the locked position thereof with said externally disposed part for preventing operative movement of said handle in at least one direction, said externally disposed part having an opening for the reception of a padlock whereby to lock said member and said externally disposed part when in engaged relation to prevent the movement of said cover part to open position.

16. In a casing having a receptacle part and a cover part mounted thereon for movement to open and closed position and an operating handle movably mounted on said cover part externally thereof, means for locking said handle in a predetermined position and concomitantly locking said cover part in closed position, comprising releasably interengaging parts on said receptacle part and cover part, respectively, for holding the latter part in closed position, one of said interengaging parts having a part disposed externally of said cover part, and means including a member movably mounted on said handle externally of said cover part for releasable engagement with said externally disposed part for preventing operative movement of said handle in at least one direction, said cover part having a slot at a side edge portion thereof, and said externally disposed part comprising an arm projecting outwardly of said casing through said cover slot in the closed position of said cover part, said arm having an opening for the reception of a padlock whereby to lock said member and said arm when in engaged relation to prevent the movement of said cover part to open position.

17. In a casing having a receptacle part and a cover part mounted thereon for movement to open and closed position and an operating handle movably mounted on said cover part externally thereof, means for locking said handle in a predetermined position and concomitantly locking said cover part in closed position, comprising releasably interengaging parts on said receptacle part and cover part, respectively, for holding the latter part in closed position, one of said interengaging parts having a part disposed externally of said cover part, and means including a member pivotally mounted on said handle externally of said cover part and movable between retracted and projected positions, said member in said projected position thereof being adapted for releasable engagement with said externally disposed part for preventing operative movement of said handle in at least one direction, said cover part having a slot at a side edge portion thereof, and said externally disposed part comprising an arm projecting outwardly of said casing through said cover slot in the closed position of said cover part, said arm having an opening for the reception of a padlock whereby to lock said member and said arm when in engaged relation to prevent the movement of said cover part to open position.

18. In a casing having a receptacle part and a cover part mounted thereon for movement to open and closed positions and an operating handle movably mounted on said cover part externally thereof, means for locking said handle in a predetermined position and concomitantly locking said cover part in closed position, comprising means on said receptacle part projecting outwardly of said casing, said cover part being slotted for the extension therethrough of said projecting means in the closed position of said cover part, and means movable in relation to said handle from a retracted position to a projected position and releasably engageable when in one of said positions with said projecting means in the closed position of said cover part, and means for releasably locking said movable means and said projecting means when in engaged relation to prevent the opening of said cover part and to prevent movement of said movable means to the other position thereof whereby to lock said handle in a predetermined position.

References Cited in the file of this patent

UNITED STATES PATENTS

| Number | Name | Date |
|---|---|---|
| 868,540 | Ferris | Oct. 15, 1907 |
| 873,481 | Aliano | Dec. 10, 1907 |
| 1,022,576 | Beehler | Apr. 9, 1912 |
| 1,191,600 | Johneson | July 18, 1916 |
| 1,330,137 | Platt | Feb. 10, 1920 |
| 1,333,874 | Platt | Mar. 16, 1920 |
| 1,629,728 | Osgood | May 24, 1927 |
| 1,681,850 | Getchell | Aug. 21, 1928 |
| 1,719,272 | Lee | July 2, 1929 |
| 1,743,434 | Cramer | Jan. 14, 1930 |